United States Patent [19]

Phillips et al.

[11] Patent Number: 4,922,159
[45] Date of Patent: May 1, 1990

[54] LINEAR PRECISION ACTUATOR WITH ACCELEROMETER FEEDBACK

[75] Inventors: Douglas J. Phillips, Melbourne; Keith E. Kessler; John W. Shipley, both of Palm Bay; Dave Hyland, Melbourne Beach, all of Fla.

[73] Assignee: Harris Corporation, Melbourne, Fla.

[21] Appl. No.: 191,368

[22] Filed: May 9, 1988

[51] Int. Cl.$^5$ .................. H02K 5/24; F16K 31/08
[52] U.S. Cl. .................. 318/128; 73/517 AV; 244/164; 244/170; 310/51
[58] Field of Search ............ 73/517 AV, 517 B; 244/158 R, 164, 170; 310/13, 15, 51; 318/128, 135; 381/71

[56] References Cited

U.S. PATENT DOCUMENTS

| | | | |
|---|---|---|---|
| 4,512,193 | 4/1985 | Fukano | 73/517 B |
| 4,600,863 | 7/1986 | Chaplin et al. | 310/51 |
| 4,710,656 | 12/1987 | Studer | 310/51 |
| 4,792,708 | 12/1988 | Boyer | 310/15 |

Primary Examiner—Patrick R. Salce
Assistant Examiner—D. L. Rebsch
Attorney, Agent, or Firm—Antonelli, Terry & Wands

[57] ABSTRACT

A high precision linear actuator for compensating short stroke, high frequency vibrations in a space deployed structure comprises a set of cylindrical magnetic pole pieces affixed to respective ones of a pair of graphite flexures, that are mounted to a thermally conductive cylindrical housing, which is to be affixed to the space deployed structure. Reaction against the "proof mass" pole pieces is achieved by a magnetic field produced by set of stationary magnetic coils that surround the pole pieces and are energized by a vibration compensation reaction current supplied from a sense/control processor. Coaxial with and mounted integrally with the cylindrical pole pieces of the proof mass is an internal accelerater, which generates an output signal representative of the force to which the proof mass is subjected. This output signal is monitored by the sense/control processor to close a force feedback loop and effectively reduce both the inherent resonance imparted by the spiral support flexures and non-linearities in the magnetic field, against which the "proof mass" cylindrical pole pieces react in the course of operation of the actuator. The vibration compensation drive signal that is supplied by the sense/control processor may be based upon the output of a second accelerometer that is mounted integrally with the cylindrical housing, but external to the flexures, by way of which the "proof mass" pole pieces, associated drive coils and internal accelerometer are supported.

10 Claims, 2 Drawing Sheets

LINEAR PRECISION ACTUATOR WITH ACCELEROMETER FEEDBACK

FIELD OF THE INVENTION

The present invention relates in general to vibration control mechanisms and is particularly directed to an apparatus for controlling the vibration of space deployed structures, such as space mirrors and antennas.

BACKGROUND OF THE INVENTION

Space deployed structures, unlike their terrestrial counterparts, have no viscous damping from the atmosphere and may require active vibration compensation, not only for long period, small amplitude motions (sway), but for short period, small amplitude vibrations (sway). For this purpose, "proof mass" reaction actuator systems that absorb the reaction force of an actuator as it applies force to the structure have been proposed. For large space structures, such as truss supports, that are subject to low frequency (typically less than one Hz), large magnitude (multi-cm) displacements, a linear D.C. motor actuator of the type described in copending Patent application Ser. No. 000,773, filed Jan. 6, 1987, entitled "Linear D.C. Motor Vibration Controller" by T. Otten et al, and assigned to the assignee of the present application, has been found to be particularly useful in maintaining a precise, controlled reaction against a proof mass in a linear direction. For small amplitude (less than a quarter of an inch), high frequency (e.g. 10-300 Hz) vibrations, however, to which two-dimensional structures such as space mirrors and antennas may be subjected, such large vibration compensation mechanisms are not particularly useful because of their substantial mass and longer period of translation. In addition, large sized linear displacement systems typically employ a bearing-containing transport unit which inherently possesses nonlinearities that introduce unwanted distortion into the vibration compensating force input.

SUMMARY OF THE INVENTION

In accordance with the present invention, there is provided a lightweight, compact, high precision linear actuator that is adapted to be integrally mounted to and compensate for short stroke, high frequency vibrations to which a space deployed structure, such as a space mirror or antenna, may be subjected. For this purpose, the actuator comprises a compact proof mass formed of a set of cylindrical magnetic pole pieces affixed to respective ones of a pair of spirally configured, graphite flexures, that are mounted, at their periphery, to a thermally conductive cylindrical housing, which is to be affixed to the space deployed structure. Reaction against the "proof mass" pole pieces is achieved by a magnetic field generated by the controlled energization of a set of magnetic coils rigidly mounted within the housing, the coils being surrounded by the pole pieces and being energized by a reaction current supplied from a vibration compensation control processor.

Coaxial with and mounted integrally within the cylindrical pole pieces of the proof mass is an internal accelerometer, which generates an output signal representative of the force to which the proof mass is subjected. This output signal is monitored by the control processor to close a force feedback loop and effectively reduce both the inherent resonance imparted by the spiral support flexures and non-inearities in the magnetic field against which the "proof mass" cylindrical pole pieces react in the course of operation of the actuator.

The vibration compensation drive signal that is supplied by the control processor may be based upon the output of a second accelerometer that is mounted integrally with the cylindrical housing, but external to the flexures by way of which the "proof mass" pole pieces, associated drive coils and internal accelerometer, are supported. Because the housing is affixed to the space deployed structure, this second accelerometer provides an output signal that is representative of vibrations in the structure to which the control processor responds in generating a compensation drive current to the coils of the actuator for dampening the detected vibration of the structure.

DETAILED DESCRIPTION OF THE DRAWINGS

Figure 1:
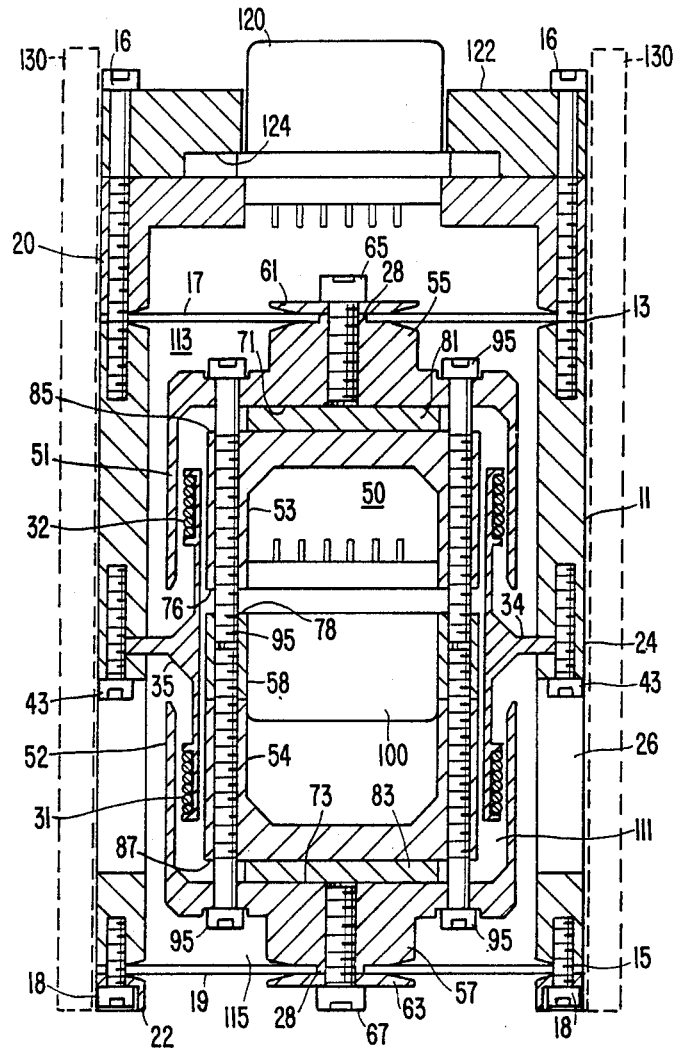
Figure 2:
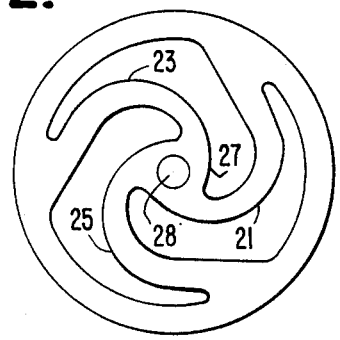
Figure 3:
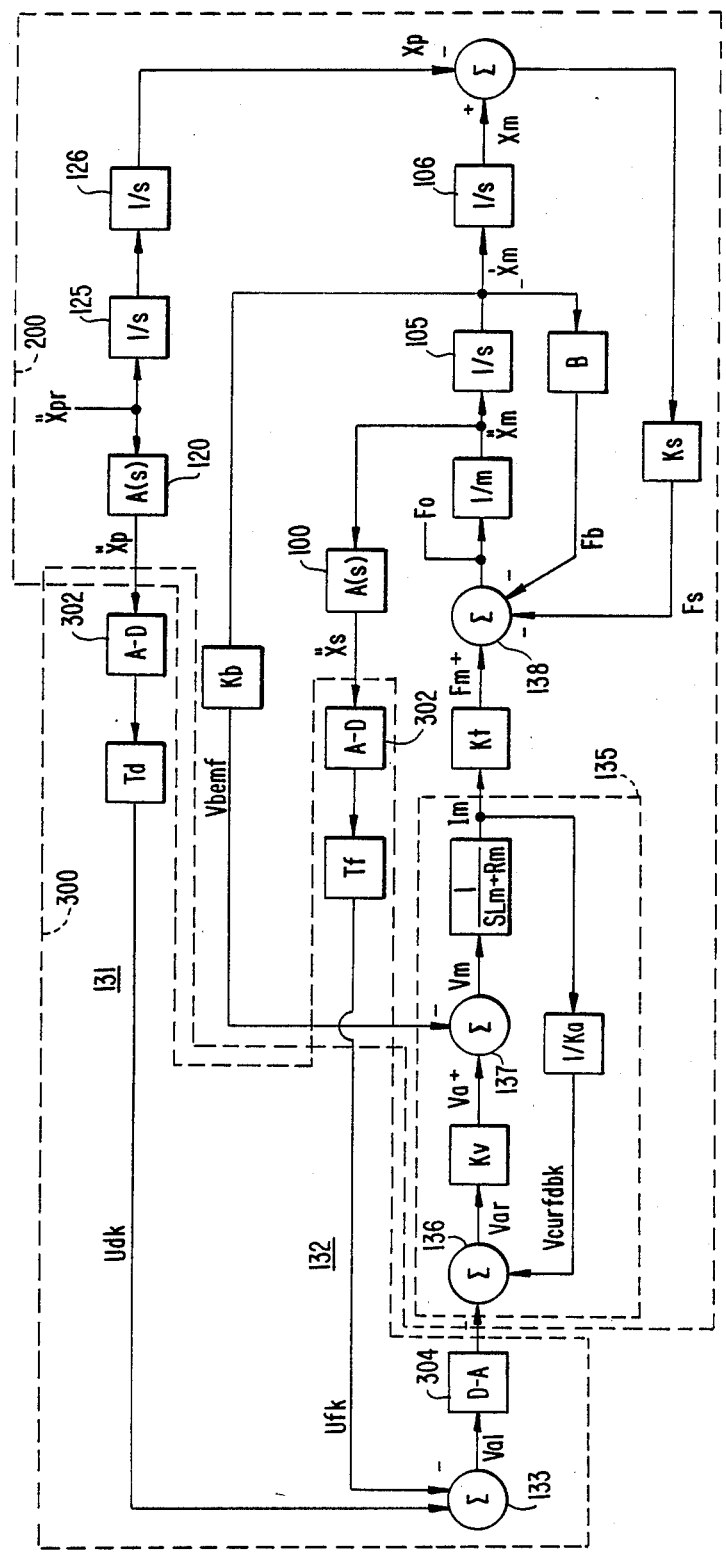

FIG. 1 is a diagrammatic side-sectional view of an embodiment of a linear precision actuator in accordance with the present invention;

FIG. 2 diagrammatically shows the configuration of an individual triskelion-shaped graphite flexure; and FIG. 3 is a diagrammatic illustration of a mathematical model of the linear precision actuator and associated force control mechanisms carried out by an associated control processor in accordance with the present invention.

DETAILED DESCRIPTION

Referring now to FIG. 1 of the drawings, an embodiment of a linear precision actuator in accordance with the present invention is diagrammatically illustrated in longitudinal cross-section as comprising a generally cylindrically shaped housing 11 having annular end surfaces 13 and 15, to respective ones of which thin (thickness on the order of 30 mils) graphite flexures 17 and 19 are attached at their peripheries by means of a cup-shaped bracket 20 that is urged against annular end surface 13 of cylindrical housing 11 by means of attachment bolts 16, and by an annular retention ring 22 that is urged against annular end surface of housing 11 by means of attachment bolts 18. As shown in FIG. 2, an individual graphite flexure is configured as a triskelion-shaped disc having three spirally-curved flexible leg members 21, 23 and 25 extending from a central circular hub portion 27, through which a circular aperture 28 is formed, to an outer annular ring portion 29, the annular width of which corresponds to the thickness of housing 11.

Housing 11 is preferably comprised of a lightweight, thermally conductive material, such as aluminum, in order to provide a rigid support for the components of the actuator and form a heat sink for the removal of $I^2R$ thermal losses generated during the application of a magnetic field-generating current to a pair of coil windings 31 and 32 which are wound around a thin cylindrical coil support 35. Like housing 11, coil support 35 is preferably formed of aluminum and is affixed, midlength, at an enlarged diameter ring portion 34 thereof and associated mounting bolts 43 to a stepped, annular wall portion 24 of housing 11. Housing 11 is formed of two halves, joined together with mounting bolts 43, supporting coil windings 31 and 32 and an internally mounted accelerometer, as will be described below.

Surrounding and in close juxtaposition with cylindrical coil support 35 is a "proof mass" 50, essentially comprising a pair of cylindrical, cup-shaped outer magnetic pole pieces 51 and 52 and an associated set of cylindrical, cup-shaped inner magnetic pole pieces 53 and 54. Outer magnetic pole pieces 53 and 54 are secured to flexures 17 and 19, respectively, at mounting standoff portions 55 and 57, by way of associated washers 61,63 and mounting bolts 65,67. As shown in FIG. 1, mounting bolts 65,67 pass through the central circular apertures 28 in respective flexures 17 and 19, which are coaxial with an axis 70 of housing 11, about which the components of the actuator are cylindrically symmetrical. Each of the outer and inner cup-shaped magnetic pole pieces is formed of a suitable ferromagnetic material, such as iron, which makes up a substantial portion of the "proof mass". The bottom interior surfaces 71 and 73 of outer magnetic pole pieces 51 and 52 abut against disc-shaped, neodymium-iron-boron magnets 81 and 83, respectively which, in turn, are urged against the end surfaces 85 and 87 of axially separated inner pole pieces 53 and 54 by a set of (e.g. eight) retention bolts 95, which are screwed into tapped apertures in opposite ends of an interior cylindrical casing element 58. Between the bottom surface 76 of pole piece 53 and an end surface 78 of cylindrical casing element 58, the annular lip of an accelerometer 100 is frictionally captured as bolts 95 urge inner pole piece 53 against casing element 58. Inner pole pieces 53, 54, disc-shaped magnets 81,83 and outer pole pieces 51,52 provide low reluctance flux paths for the magnetic fields generated by coils 31,32.

As shown in FIG. 1, the outer diameter of each of inner cup-shaped pole pieces 53, 54 is less than the inner diameter of outer cup-shaped magnetic pole pieces 51 and 52, so as to provide a cylindrical space 111 for accommodating coil windings 31 and 32 and cylindrical coil support 35 and also permitting relative axial displacement between the "proof mass" pole pieces and their associated magnetic field-generating windings. Additional 'flexing' regions 113 and 115 are provided between pole pieces 51 and 52 and flexures 17 and 19 by standoff portions 55 and 57. A slot or gap (not shown) may be provided in casing element 58 and coil support 35 to facilitate electrical wire access to accelerometer 100.

The vibration-sensing/compensaton control electronics, for the actuator, including control processor circuitry, may be integrated within or may be located externally of housing 11, as by means of an integrated circuit board mounting configuration shown in FIG. 1 by broken lines 130 surrounding housing 11, as shown in FIG. 1. Preferably, the control processor comprises conventional microprocessor (and associated interface components, including multiplexed D-A, A-D and power amplifier circuitry) which monitors force-representative signals produced by "proof mass" accelerometer 100 and structure vibration-sensing accelerometer 120 and executes a pair of force control loops, to be described below with reference to FIG. 3, so as to impart a controlled reaction force to the structure to which the actuator is attached by reacting against the proof mass and, in the course of such operation, compensating for distortion-introducing characteristics of the actuator assembly itself.

Namely, as mentioned previously, structural vibration to be compensated by the actuator may be measured by a separate accelerometer dedicated for the purpose and shown at 120 in FIG. 1. Like accelerometer 100, accelerometer 120 is cylindrically configured and axially aligned with the components of the actuator. However, it is physically located external of the actuator housing 11, being attached thereto by means of a cylindrical clamp piece 122 which is urged against an annular lip portion 124 of the housing of accelerometer 120 as bolts 16 are tightened to capture accelerometer 120 between clamp piece 122 and cup-shaped support bracket 20.

In operation, in response to a vibration dampening drive current supplied to coil windings 31 and 32 (by control electronics 130, the operational control mechanism for which will be described below with reference to FIG. 3) a magnetic field is generated, against which the inner and outer cup-shaped pole pieces and disc magnets react, to cause displacement of the "proof mass" 50 relative to coils 31 and 32 and, consequently, housing 11, which is affixed to the vibrating space deployed structure, such as a mirror or antenna body. The magnitude of the displacement, or stroke, is constrained by flexures 17 and 19, which flexibly couple the "proof mass" to the housing. Because graphite flexures 17 and 19 are elastically deformable, they tend to introduce a decaying resonant component to the movement of the "proof mass", when flexed in the axial direction.

In accordance with the invention, the presence of internal accelerometer 100, which is integrally mounted with the "proof mass" structure, permits this unwanted potential corruption of the desired dampening movement of the "proof mass" to be monitored and, via a force feedback loop from accelerometer 100 to the control processor, the reaction force drive current to coils 31 and 32 is adjusted to effectively remove the resonant component. In addition, this force feedback loop enables the control processor to correct for other unwanted distortion, such as non-linearities in the reaction force-inducing magnetic field.

As pointed out above, the control electronics that monitors the output of accelerometers 100 and 120 and controls the supply of energizing current to coil windings 31 and 32 preferably comprise conventional microprocessor and associated interface circuits commonly employed in sensor/actuator control systems and a description of the details of which is unnecessary for understanding the structure and operation of the present invention. Accordingly, the description to follow will focus upon the vibration compensation and force feedback control mechanisms, the execution of which enables the actuator to provide the intended reduced noise, precision vibration compensation of a space-deployed structure, such as a solar mirror or antenna. The dual force control algorithm through which control processor 130 controls the generation of reaction force drive current to the coils 31 and 32 may be best understood by reference to a mathematical model of the components of the actuator (and associated processor control loops), shown diagrammatically as a transfer function flow diagram in FIG. 3. In the Figure, interrelationships among and the behavior of the electromechanical components of the actuator are represented by a set of mathematical symbols contained within broken lines 200, while the force feedback control loop executed by the control processor is contained within broken lines 300.

The (analog) output $\ddot{X}p$ measurement of accelerometer 120 (the transfer function of which is denoted by $A(s)_{120}$), represents a measure of the actual vibrations $\ddot{X}pr$ in the (space deployed) structure to which motion compensation is to be imparted by controlled energization of the actuator coils. This analog output $\ddot{X}p$ is digitally sampled via an input A-D converter 302 and output digital data therefrom is coupled to a vibration suppression loop 131, within control loop 300 executed by processor 130, comprised of a vibration suppression operator Td.

Similarly, the (analog) output $\ddot{X}s$ of accelerometer 100 (the transfer function of which is denoted by $A(s)_{100}$, represents a measure of the actual force response $\ddot{X}m$ of the proof mass 50 of the actuator. This accelerometer output signal $\ddot{X}s$ is digitally sampled via input A-D converter 302 and coupled to a force feedback loop 132 of control loop 300, executed by processor 130, comprised of a force compensation operator Tf which, as pointed out above, compensates for the spring-mass resonance of the graphite flexures 17 and 19 and reduces nonlinearities associated with the electromagnetic components of the actuator. The outputs of operators Td and Tf are summed at 133 and coupled to a digital-analog converter 134, from which a drive signal for causing the generation of an electrmagnetic force for displacing the proof mass of the actuator is produced.

The drive signal is coupled to a power amplifier the output of which supplies the drive current for energizing coil windings of the actuator, so that a magnetic field for imparting a controlled force to the pole pieces of the proof mass may be generated. The gain characteristics of the power amplifier and the inductance/resistance parameters of the coil windings are represented in FIG. 3 by block 135, which receives the analog control output signal produced by D-A converter and a back EMF motor constant operator Kb associated with the actuator and generates an output drive current Im for producing the magnetic field which displaces the pole pieces of the proof mass.

Within block 135 the inverse of the current gain constant Ka of the drive coils is fed back from the output and difference-combined (subtracted from) with the input signal at block 136. This difference output is then (voltage-) amplified (Kv) by the power amplifier and difference combined at 137 with the back EMF (Kb) to produce a voltage input Vm to the coils 31 and 32 of the actuator. The impedance paramters of the coils, in terms of coil inductance Lm (Henrys) and coil resistance Rm (Ohms) then defines the coil drive current Im. Block Kt represents the motor force constant (Newtons/amp) of the actuator which produces a force Fm to applied to the displaceable proof mass pole pieces of the actuator.

Differentially combined in block 138 is the effect Fb of any viscous damping (B) applied to the proof mass and the effect Fs of flexures 17 and 19 (spring constant Ks), producing a resultant output force $F_o$ to be applied to the proof mass m, the acceleration $\ddot{X}m$ of which is defined by dividing the applied force Fo by the mass m.

The displacement components of the model are indicated by sets of s domain blocks 125, 126 from accelerometer 120 and s domain blocks 105,106 which monitor the reaction force to the proof mass (in Kg), denoted by block 1/m. Since accelerometer 100 is mounted integrally within the proof mass m its output $\ddot{X}s$ provides a direct measure of the force which, as noted above is applied to operator Tf within force feedback loop 132.

As described above, the force feedback loop 132 comprising operator Tf compensates for the spring-mass resonance of the graphite flexures (e.g. on the order of (9 Hz)) and shapes the actuator force transfer function to be flat over a prescribed operational bandwidth (e.g. from 5 to 300 Hz.) This feedback loop also reduces nonlinearities associated with the electromechanical components of the actuator (coils and pole pieces). The local active vibration suppression control loop 131, comprising operator Td, monitors the output of accelerometer 120 for the purpose of reducing the vibration of the (large space) structure to which the actuator is attached. This force loop operates so that modal uncertainties in the structure, such as natural frequencies, will not significantly affect the performance of the actuator or destabilize the system.

The lead/lag compensator of force loop operator Tf is a discrete time-equivalent of the following transfer function:

$$Tf(s) = K(s+a)/(s+b) \quad (1)$$

where a and b are constants. In equation (1), the low frequncy pole shifts the resonant frequency and adds damping, while the zero compensates for rolloff. For purposes of an illustrative example, letting a=84.7 and b=3.02, Figures FIGS. 4 and 5 show the frequency response of the actuator without the force feedback loop, while FIGS. 6 and 7 show the response with the force control loop. To implement equation (1) in discrete (digital) form, bilinear z tranformation was used without prewarping, which is not required when using (A-D) sampling rates in excess of 1000 Hz. The corresponding transfer function Tf(z) is defined as:

$$Tf(z) = K(b1 + b0z^{-1})/(1 + a0z^{-1}) \quad (2)$$

where
b1 = (2+Ta)/(2+Tb),
b0 = (Ta−2)/(2+Tb), and
a0 = (Tb−2)/(Tb+2),

Letting $Uf(z) = Tf(z)\ddot{X}$ results in a linear difference equation for a time period [(kt)−(k+1)t] in terms of the past outputs and past and present inputs, yielding $$Uf(k) = -a0Uf(k-1) + Kb1\ddot{X}s(k) + Lb0\ddot{X}s(k-1) \quad (3)$$

Uf(k) is then summed (in summation block 133) with the Td operator output Ud(k) and coupled to D-A converter 134 for supplying the drive input to the power amplifier.

The transfer function of the vibration suppression control loop 131 (containing operator Td) is both positive and real, so that system stability is guaranteed regardless of the dynamic behavior of the space structure. If the dynamics of the accelerometer or the actuator are near or within the control band, the Td operator must provide copensation to them to remain positive and real. Since the dynamics of the accelerometer and the actuator do not require compensation, the Td operator reduces to a rate feedback algorithm which estimates the structural velocity on the basis of the output from accelerometer 120 and multiplies this estimate by a constant gain K. The velocity estimator has a continuous time transfer function H(s) defined by:

$$H(s) = \hat{X}p(s)/\ddot{X}p(s) = s/(s/\alpha + 1)^2 \quad (4)$$

where α is much less than the first natural frequency of the large space structure. A pure integrator is not used to obtain the velocity due to its susceptibility to D.C. bias signals which would saturate the controller output.

The velocity estimate is multiplied by the feedback gain K so that:

$$Td(s) = Ud(s)\ddot{X}p(s) = KH(s) \quad (5)$$

Transfer function Td(s) is converted to a discrete form Td(z) as:

$$Td(z) = K(1-z^{-1})/(1-2e^{-\alpha t}+e^{-2\alpha t}) \quad (6)$$

This Z domain function is implemented by processor 130 using a linear difference equation which expresses the output Ud at time interval [(kt)−(k+1)t] in terms of the past outputs and the past and present inputs Xp, as follows:

$$Ud(k) = 2e^{-\alpha t}Ud(k-1) - e^{-2\alpha t}Ud(k-2) + KX''p(k) - KX''p(k-1) \quad (7)$$

Output Ud(k) is summed with Uf(k) in summation block 133 and coupled as a digital input to D-A converter for supplying a drive signal to the power amplifier Ka which is updated for the next time interval [(kt)−(k+1)t].

As will be appreciated from the foregoing description, the present invention provides a compact, high precision linear actuator for compensating for short stroke, high frequency vibrations to which a space deployed structure, such as a space mirror or antenna, may be subjected. Reaction against internal proof mass pole pieces, which are constrained by a pair of elastic flexures, is achieved by a magnetic field generated by the controlled energization of a set of magnetic coils rigidly mounted within the actuator housing, the coils surrounding the pole pieces and being energized by a reaction current supplied from a vibration compensation control processor. By monitoring the output of an internal accelerometer, which generates an output signal representative of the force to which the proof mass is subjected, the control processor is able to close a force feedback loop and effectively reduce both the inherent resonance imparted by the support flexures and non-linearities in the magnetic field against which the proof mass pieces ract in the course of operation of the actuator. The vibration compensation drive signal that is supplied by the control processor may be based upon the output of a second accelerometer that is mounted integrally with the actuator. Because the housing is affixed to the space deployed structure, this second accelerometer provides an output signal that is representative of vibrations in the structure to which the control processor responds in generating a compensation drive current to the coils of the actuator for dampening the detected vibration of the structure.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. An actuator comprising:
   a housing, adapted to be to be attached to a structure, vibration of which is to be compensated;
   a displaceable proof mass supported within said housing by elastically deformable means for constraining the displacement of said proof mass;
   means, coupled to said housing, for causing an acceleration of said proof mass against which said housing and any structure attached thereto react;
   force measurement means, integrally coupled with said proof mass, for measuring characteristics of the force produced in the course of the acceleration of said proof mass, and generating an output signal representative thereof; and
   means, responsive to said output signal, for controlling the manner in which said acceleration causing means causes the acceleration of said proof mass.

2. An actuator according to claim 1, wherein said controlling means includes a force feedback loop coupled to said force measurement means through which the operation of said acceleration causing means is controlled in accordance with prescribed characteristics of said output signal.

3. An actuator according to claim 2, wherein said controlling means includes means for controlling the operation of said acceleration causing means so as to reduce the magnitude of prescribed characteristics of said output signal.

4. An actuator according to claim 3, wherein said displaceable proof mass comprises a magnetic field responsive element and said acceleration causing means comprises means for generating a controlled magnetic field in response to which said magnetic field responsive element is accelerated.

5. An actuator according to claim 4, wherein said housing has a generally cylindrical configuration and said magnetic field responsive element comprises a first pair of generally cup-shaped pole pieces and a second pair of generally cup-shaped pole pieces coaxial with and having a diameter different than said first pair of pole pieces so as to form a generally cylindrical space therebetween, and wherein said magnetic field generating means comprises a pair of electrical coils supported within said generally cylindrical space.

6. An actuator according to claim 5, wherein said elastically deformable means comprises a pair of flexures, affixed to longitudinally spaced apart portions of said housing, to which said first and second pairs of cup-shaped poles pieces are connected so as to be supported thereby in an axially translatable configuration.

7. An actuator according to claim 6, wherein said magnetic field generating means comprises a generally cylindrical support member affixed to said housing within said generally cylindrical space and around which said pair of electrical coils are wound.

8. An actuator according to claim 7, wherein each of said flexures comprises a multi-curve legged graphite flexure.

9. An actuator according to claim 1, wherein said force measurement means comprises a first accelerometer integrally coupled with said proof mass, and further including a second accelerometer coupled with said housing for measuring vibrations in a structure to which said housing is attached and producing a vibration representative output signal.

10. An actuator according to claim 9, further including means for controlling the operation of said acceleration causing means in accordance with the vibration representative signal.

* * * * *